United States Patent
Chiba et al.

(10) Patent No.: US 7,692,533 B2
(45) Date of Patent: Apr. 6, 2010

(54) SECURITY FOR NAVIGATION SYSTEM AND GARAGE DOOR OPENER

(75) Inventors: Tanemichi Chiba, Novi, MI (US); Hiroto Uesaka, West Bloomfield, MI (US); Justin McBride, West Bloomfield, MI (US)

(73) Assignee: DENSO International America, Inc., Southfield, MI (US)

( * ) Notice: Subject to any disclaimer, the term of this patent is extended or adjusted under 35 U.S.C. 154(b) by 308 days.

(21) Appl. No.: 12/001,216

(22) Filed: Dec. 11, 2007

(65) Prior Publication Data
US 2009/0146797 A1 Jun. 11, 2009

(51) Int. Cl.
*B60R 25/10* (2006.01)
(52) U.S. Cl. .................................................. 340/426.1
(58) Field of Classification Search .............. 340/426.1, 340/426.11, 438, 440, 463, 541, 5.71, 539.1
See application file for complete search history.

(56) References Cited

U.S. PATENT DOCUMENTS

| | | | | |
|---|---|---|---|---|
| 5,034,729 A | * | 7/1991 | Lundquist | 340/683 |
| 5,510,765 A | * | 4/1996 | Madau | 340/541 |
| 6,127,922 A | * | 10/2000 | Roddy et al. | 340/426.14 |
| 2004/0257208 A1 | * | 12/2004 | Huang et al. | 340/426.1 |
| 2005/0250440 A1 | * | 11/2005 | Zhou et al. | 455/12.1 |

FOREIGN PATENT DOCUMENTS

KR 2005 0008161 1/2005

\* cited by examiner

*Primary Examiner*—Phung Nguyen
(74) *Attorney, Agent, or Firm*—Harness, Dickey & Pierce, PLC

(57) ABSTRACT

A method of operating a security system using a vehicle and preventing access to a vehicle system and to a vehicle garage may entail monitoring a security condition of the vehicle with a vehicle electronic control unit ("ECU"). Upon detecting an unsecure condition, such as a vibration, an alarm may sound and then the ECU may deactivate a vehicle system, such as a navigation system, to prevent access to personal or business addresses. Further, devices such as garage door openers in the vehicle and an in-garage, garage door opener may be disabled by satellite, cell tower, wire or direct wireless communication between the ECU and the device to be disabled. Silencing the vehicle alarm and reactivating all garage door openers and the navigation system may be accomplished by turning a key within an exterior vehicle lock or entering a code into the navigation system.

21 Claims, 3 Drawing Sheets

SECURITY FOR NAVIGATION SYSTEM AND GARAGE DOOR OPENER

FIELD

The present disclosure relates to a security system for a vehicle and, more particularly, to a method of controlling access to personal information stored in a vehicle system.

BACKGROUND

The statements in this section merely provide background information related to the present disclosure and may not constitute prior art. Many vehicles are equipped with features, such as a navigation system and an automatic garage door opener, that provide convenience to the vehicle driver. The navigation system, for example, permits the driver to input a destination address into the navigation system that then provides instructions to the driver to guide the driver from the current vehicle location to the destination address. The navigation system may also provide the added convenience of permitting the driver to store destination addresses for future repeat use and quickly retrieve the stored information. The stored addresses may include often-used addresses, like a home address or a place of business address.

The garage door opener permits the driver to remotely open a garage door from inside the vehicle by simply pushing a button. Some vehicles provide added convenience by incorporating a programmable garage door opener into a passenger compartment of the vehicle, such as a built-in opener.

While these features provide convenience, an unauthorized driver, particularly a vehicle thief, can also use the navigation system and garage door opener features to gain access to a home or business. For example, the unauthorized driver may first gain access to the vehicle and access the home address information stored in the navigation system. The unauthorized driver may then use the navigation system to guide him or her directly to the address and home associated with the vehicle. Once at the home, the unauthorized driver may open the garage door with the garage door opener to gain access to the garage and then perhaps to the home interior through an unlocked access door of the home. It is desirable, therefore, to have a system that detects unauthorized access to the vehicle and restricts access to address specific information stored within the vehicle, and vehicle devices, when unauthorized vehicle access has been detected.

SUMMARY

A method is provided for operating a security system for a vehicle such that the vehicle includes at least one vehicle system, such as a navigation system, having memory for storing personal information. Each of the vehicle systems may access the stored personal information and use the stored information during vehicle operation. The method may include detecting a predetermined condition, such as secured or unsecured condition of the vehicle, deactivating a vehicle system based on the predetermined condition of the vehicle, and selectively reactivating the system regardless of the predetermined condition of the vehicle. The personal information is not accessible to an occupant or driver of the vehicle when the vehicle system is deactivated, but accessible to a driver of the vehicle when the vehicle system is reactivated.

A method is also provided for controlling use of personal information, such as street addresses, stored in a memory and related to a structure having a garage. The method may include detecting a predetermined condition of the vehicle, restricting access to the stored information based on the detected predetermined condition of the vehicle such that a potential driver of the vehicle cannot use the stored information to operate the system of the vehicle, and selectively permitting driver access to the information such that the driver can use the stored information to operate the system of the vehicle.

An electronic control unit of the vehicle may be used to deactivate or disable garage door openers in the vehicle, or a garage door opener in a vehicle garage. Communication with the in-vehicle garage door openers may be by wire, or wireless, depending if the opener is hardwired into the vehicle, or a wireless, portable device. Communication with a garage door opener in a garage may be by direct wireless communication from the ECU to the opener, or wireless communication from the ECU to the opener via satellite link or by using cell towers. Reactivating or re-enabling the navigation system, the in-vehicle garage door openers, and in-garage garage door openers may be by turning a keyed lock in the door or ignition of the vehicle, or by entering a code into the navigation system.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
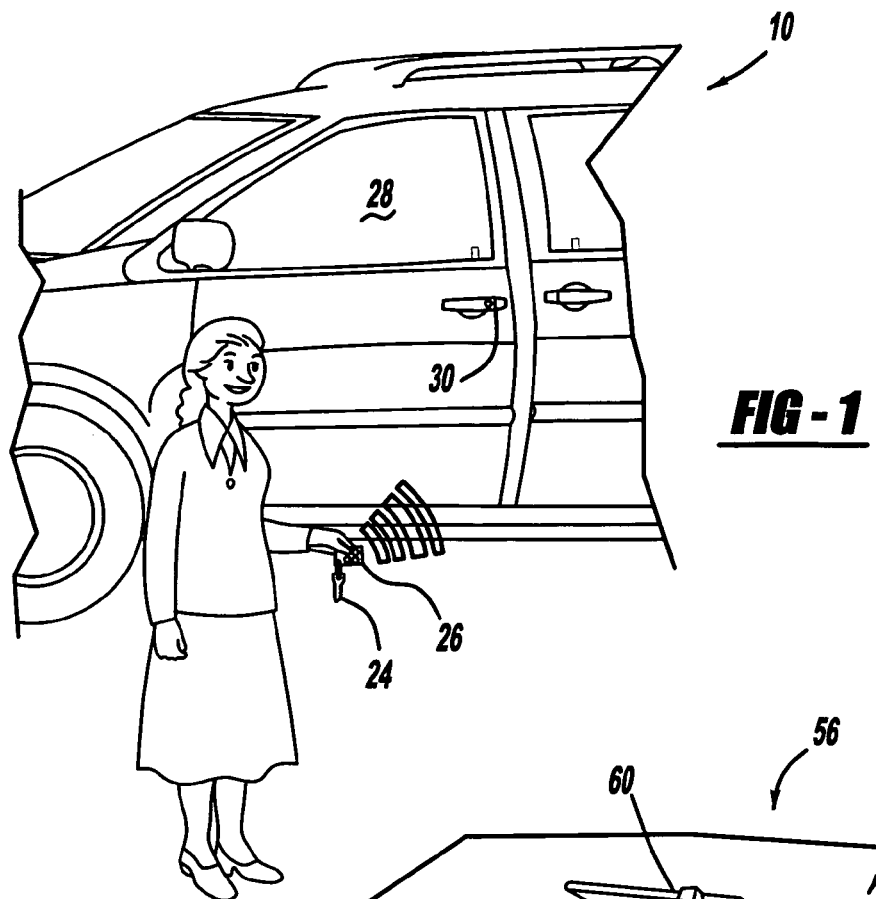
FIG. 1 is a partial perspective view of a vehicle in accordance with the teachings of the present disclosure.
Figure 2:
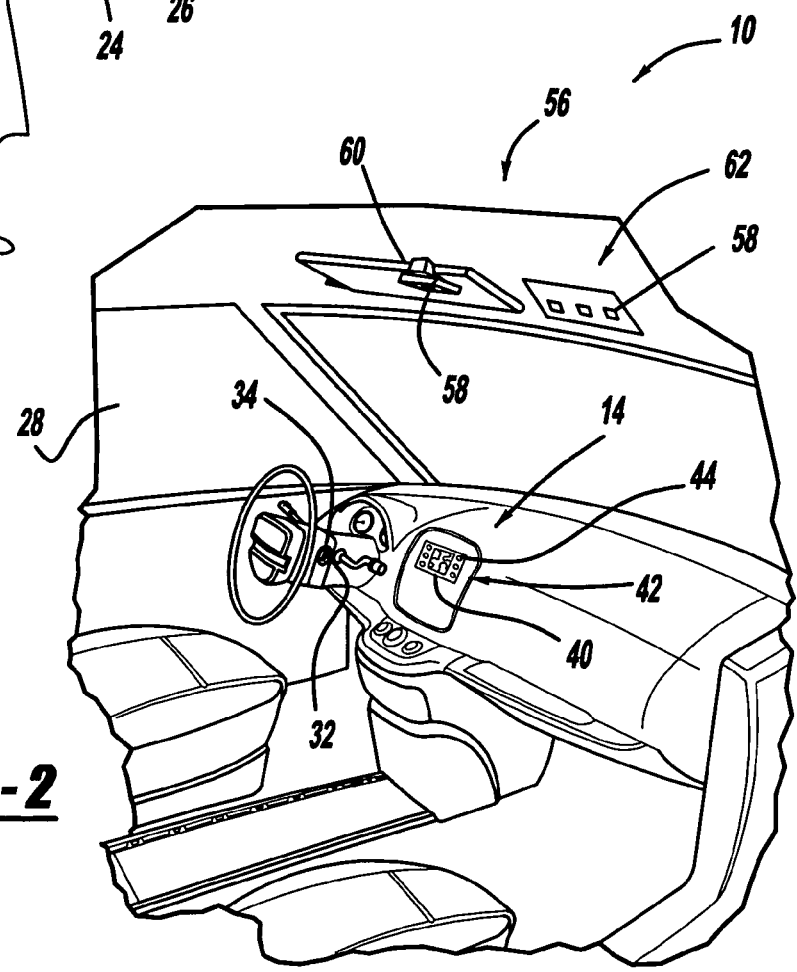
FIG. 2 is a partial perspective view of an interior of the vehicle of FIG. 1.
Figure 3:
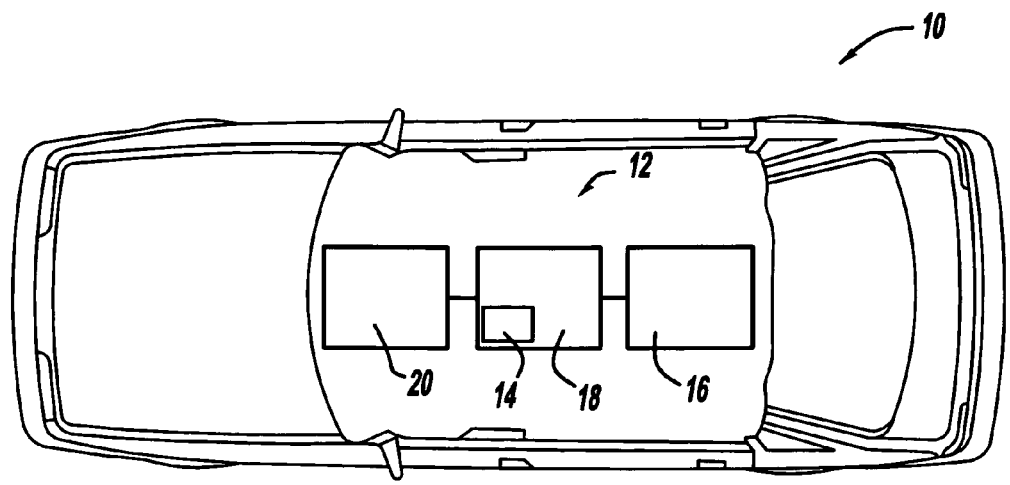
FIG. 3 is a top view, schematic representation of a security system of the vehicle of FIG. 1.

The following description is merely exemplary in nature and is not intended to limit the present disclosure, application, or uses. With reference to FIGS. 1-3, a vehicle 10 having a security system 12 is depicted in accordance with the present disclosure. The security system 12 may include an electronic control unit ("ECU") 14 that may communicate with other systems, internal and external to the vehicle, but related to functions of the vehicle 10. Such systems may include an audible or inaudible alarm system 16, a navigation system 18, and an automatic garage door opening system 20. The security system 12 may control access to personal information stored in one or more memory locations accessible by all of the systems, particularly information such as street addresses which may be stored within the navigation system 18 and the garage door opening system 20.

As illustrated in FIG. 3, The ECU 14 may be integral with the navigation system 18 and electronically link with each of the other systems 16, 20. The ECU 14 may receive a signal from the alarm system 16 when the alarm system 16 detects a predetermined condition of the vehicle 10. The ECU 14 may then send signals to control the navigation system 18 and the garage-door opening system 20 based on the received signal from the alarm system 16. Alternatively, the ECU 14 may be integral with a control module of the alarm system 16 or any other existing vehicle, system, such as an engine control module or a body control module, which may already be operable to communicate with the navigation system 18, the alarm system 16, and the garage-door opening system 20. The ECU 14 may also be a separate control module electronically and communicatively linked with each of the other systems 16, 18, 20, and devices inside the vehicle, such as opener 60 and opener 62, and devices outside of the vehicle, such as mechanical apparatus 52.

The alarm system 16 may be an electronic alarm system that is integral with the vehicle 10 and may include a key 24 or a key fob 26 operable to activate or deactivate the alarm system 16. Typically, a driver will activate the alarm system 16 when the vehicle 10 is not currently being operated and, more particularly, when the driver exits the vehicle 10, walks away from the vehicle, and leaves the vehicle unattended. The alarm system 16 may be activated when a button on the key fob 26 is pressed. When activated, the alarm system 16 may detect particular unsecure or undesirable conditions of the vehicle 10 generally associated with theft or unauthorized access, such as vehicle vibrations and/or more drastic vehicle shaking or rocking movements generally associated with an intruder who attempts to gain access to a vehicle, or steal the vehicle.

Vehicle vibrations may be detected, for instance, when a screw driver or similar device is used to pry open a door or tamper with a traditional manual-style key lock. Vibrations may also be detected when glass on the vehicle is cut or broken in an attempt to gain access to an interior compartment of the vehicle. Additionally, when the vehicle alarm is activated, the alarm system 16 may have detected movement, vibration, or use of a vehicle component, such as a window 28, a door lock 30, a steering column 32, an ignition 34, etc. that has been broken, subject to tampering, or even used for its intended purpose. Use or attempted use of vehicle components with the alarm system 16 activated may sound an audible vehicle alarm.

The alarm system 16, upon being activated when one or more of the undesirable conditions occur, as noted above, may not only sound an audible alarm, such as the resident vehicle horn for example, but also a visible alarm, such as flashing the vehicle headlights or marker lights, for example. The alarm system 16 may then also communicate the condition of the vehicle 10 to the ECU 14. The driver may choose to override and deactivate the alarm by operating the key 24 or the key fob 26, such as pressing an alarm deactivation button. In some circumstances, the alarm may deactivate on its own, particularly when any detected vibrations or vehicle shaking movements subside.

Alternatively, a remote service, such as OnStar® for example, may communicate in real-time with the ECU 14 via satellite transmission and may initiate security functions at the request of the driver. In yet another alternative, cell phone towers may be utilized to wirelessly communicate in real-time between the remote service and the ECU 14. The remote service may further be any service, generally monitored 24 hours a day by a person, that is capable of controlling vehicle functions via a satellite signal or cell phone tower signal to Regardless, the remote service may communicate the condition of the vehicle 10 to the ECU 14. For example, the authorized driver may contact the remote service and report that the vehicle 10 has been stolen. The remote service may then transmit the stolen condition of the vehicle 10 to the ECU 14. The security system 12 may incorporate both the alarm system 16 and the remote service such that the security system 12 may handle all communications between the alarm system 16 and the remote service.

The navigation system 18 may include a display 40 and a base unit 42 disposed within an occupant compartment of the vehicle. A user interface 44 of the base unit 42 may permit the driver to input a desired destination address, and the base unit 42 may communicate with a service, typically via satellite link, to receive updated maps and current positioning data for the vehicle 10. The base unit 42 may determine the position of the vehicle 10 relative to the destination address and provide visual driving directions on the display 40 and audible driving directions to explain to the driver how to get to the destination address. The base unit 42 may also include a memory feature that may permit the driver to store frequently used destination addresses, such as a home address, business address, or a work address. These stored addresses may be temporarily viewable on the display 40 when accessing or using the memory feature.

Figure 4:
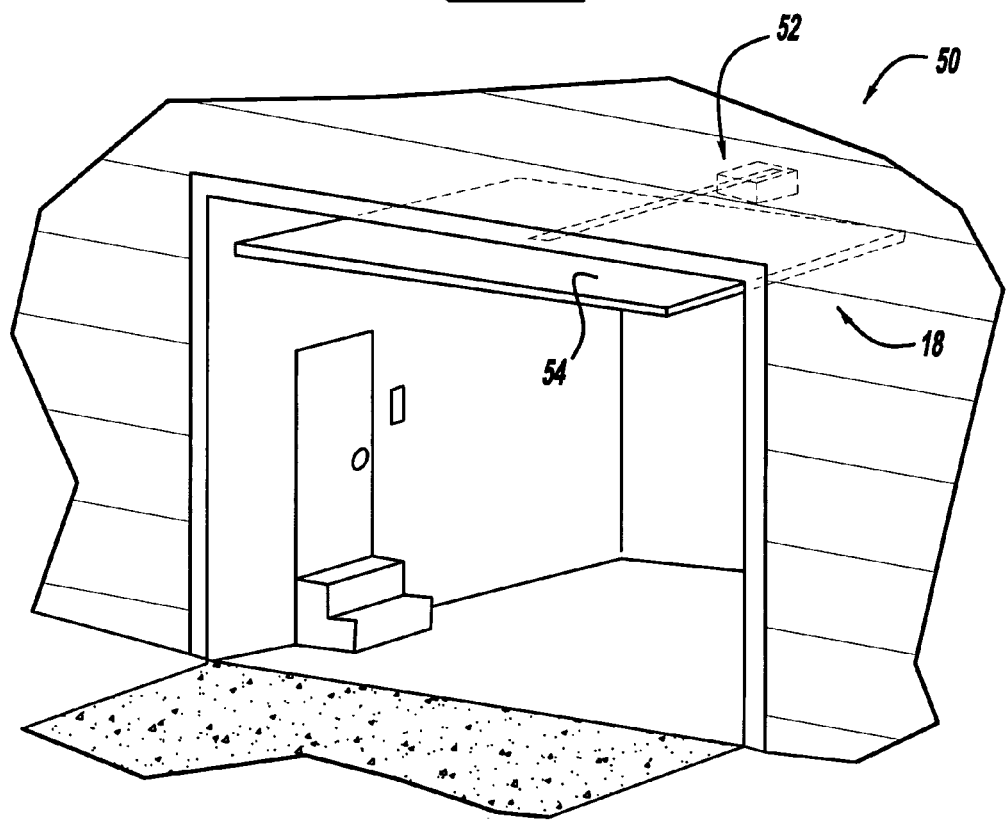
FIG. 4 is a partial perspective view of a structure having a garage.

Referring now to FIG. 4, the vehicle 10 may be stored in a garage 50 that is attached to a structure associated with one of the addresses stored in the navigation system 18. As examples, the structure may be a building at a residential or business address. The garage 50 may utilize the automatic garage-door opening system 20 within the vehicle 10. Additionally, a mechanical apparatus 52 may be coupled to a garage door 54. The mechanical apparatus 52 may include a receiver that is capable of energizing and de-energizing an electric motor that drives a chain or belt to move and thus open and close the garage door 54. The receiver, thus, may control the flow of electrical energy to the motor. To activate the motor of the mechanical apparatus 52, a driver may engage a button 58 of the garage door opener 56 within the vehicle 10 to initiate the opening or closing of the garage door 54. The garage door opener 56 includes the hand held opener 60 and the integral opener 62. The garage door opening system 20 may work in conjunction with the integral opener 62 and the hand held opener 60. For instance, upon pressing a button 58 of the integral opener 62, the garage door opening system 20 may transmit a frequency to the mechanical apparatus 52 to cause the garage door 54 to be raised or lowered, for example. However, the hand held opener 60 may or may not utilize the garage door opening system 20. That is, the hand held opener 60 may communicate directly with the mechanical apparatus 52 to cause the garage door 54 to be raised or lowered. For the present invention, the hand held opener 60 and the integral opener 62 may communicate with garage door opening system 20, the ECU 14 and the mechanical apparatus 52.

The garage-door opener 56 may be a portable, hand-held opener 60 stored primarily inside the vehicle or may be an opener 62 integrally formed or imbedded within the occupant compartment of the vehicle 10, such as in a driver's sun visor or center overhead console, as examples. Each paired combination of the hand-held opener 60 and the mechanical apparatus 52 may be pre-set at their point of manufacture to operate at a particular frequency or with a specific code that is unique to the particular opener 60 and mechanical apparatus 52 combination. The integral opener 62 may be programmed to mimic the frequency of the hand-held opener 60 and store the mimicked frequency therein. In this manner, the integral opener 62, like the hand-held opener 60, may cooperate with the particular mechanical apparatus 52 to open the garage. door 54 of the garage 50 located at the destination address where the vehicle is typically stored.

Figure 5:
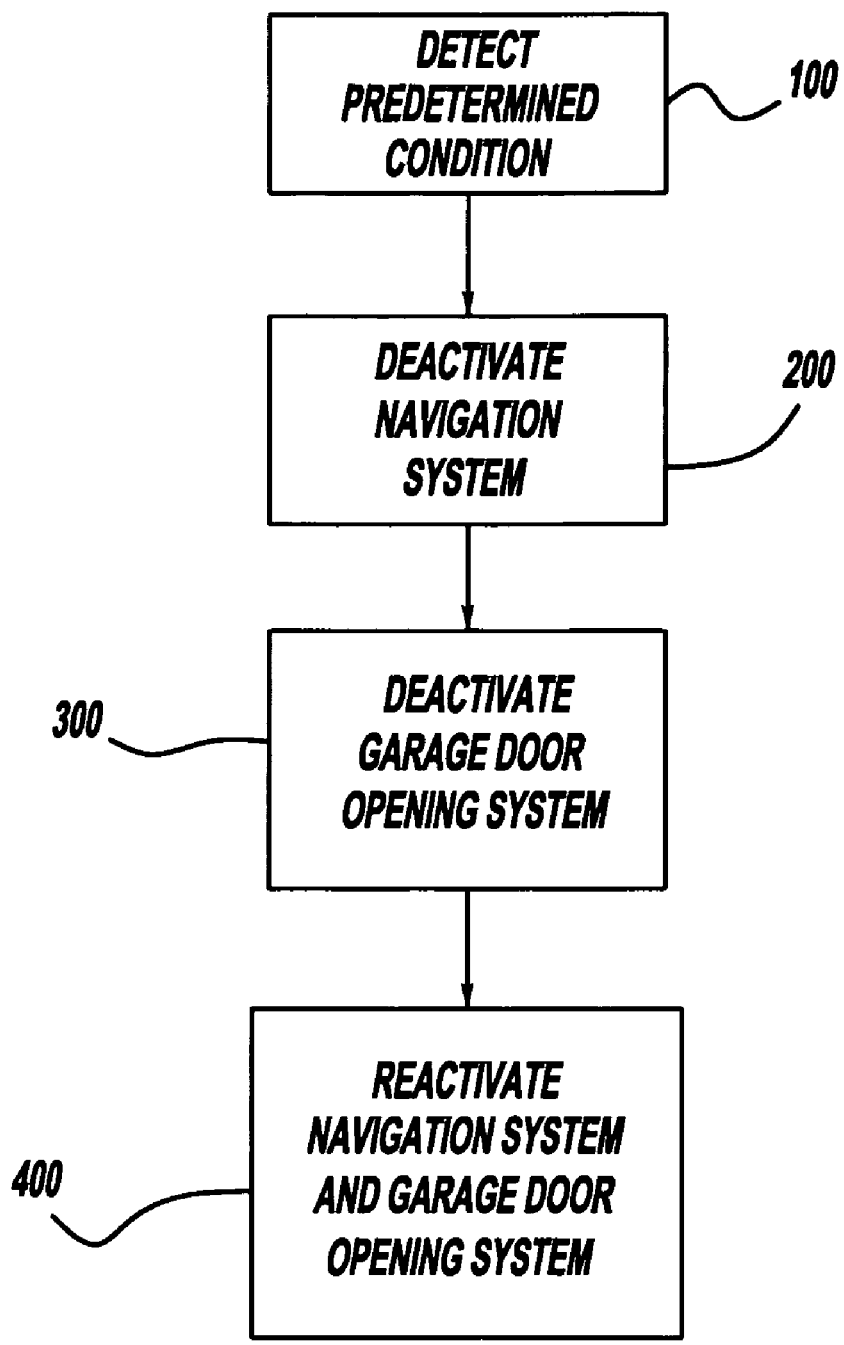
FIG. 5 is a flow chart generally depicting a logic flow of the security system of FIG. 3 in operation.

Referring now to FIG. 5, an example operation of the security system 12 will now be described in greater detail. In an operation 100, the alarm system 16 may detect, thereby sounding an alarm, one of the predetermined conditions of the vehicle 10 associated with unauthorized use or theft of the vehicle and may communicate the vehicle condition to the ECU 14, which may then communicate the vehicle condition to the remote service. Alternatively, the authorized driver or vehicle owner may discover that the vehicle 10 is missing from its expected parked location, determine that the vehicle is stolen, and then report the missing or stolen vehicle to the remote service.

Regarding the operation 200, the ECU 14 may deactivate the navigation system 18, for example by preventing electricity from powering the unit, or may direct the navigation system 18 to deactivate itself, which may preserve the link of power or electricity to the unit but restrict all functions of the navigation system 18. In deactivating the navigation system 18, access may be restricted or denied to the information stored within the memory of the base unit 42, including all address information associated with the authorized driver's home address or place of business. In effect, all addresses and information is restricted. Alternatively, the navigation system 18 may be deactivated by disabling components of the navigation system that may be used to retrieve, view, or hear the stored information, such as the memory function, the user interface 44, the display 40, or the audio output. These components may be disabled mechanically, electrically, by the underlying operating code that operates the navigation system, or any combination thereof.

Further examples of disabling may include but not be limited to: electrically or mechanically disabling specific buttons on the base unit 42 associated with unlocking the unit or accessing a memory function of the navigation system 18; initiating an alternate algorithm or subroutine in the operating code to prevent access to the stored information in memory; temporarily stopping or severing the electrical power supply; electronically, as with a code, or mechanically, as with a shield, disabling the display 40 so that the unauthorized user cannot see any directional or other information; electronically or mechanically disabling the audio output so the unauthorized user cannot hear any directional or other information; and deleting the directional or other information from memory.

Deactivated in any of the above manners, the navigation system 18 may prevent an unauthorized driver from using the navigation system 18 to discover the exact address location of a garage 50 where the vehicle 10 may be stored and thus prevent access to an adjoining structure, such as a home or business. Unfortunately, address information may be found in a vehicle in other ways. For example, an authorized user's home or business address information may be included on paper documents such as vehicle registration documents, insurance documents, or other documents that may be stored in the vehicle 10. In yet another scenario, the vehicle 10 may simply be parked in a driveway or upon a street near the garage 50 or residence or business of the authorized user. Using these alternate sources of information, the unauthorized driver may still discover the address and attempt to use the garage-door opener 56, such as a hand-held opener 60 or an integral opener 62, to access the garage 50 and additionally, the structure, such as a house or business, associated with the garage 50.

In an operation 300, the ECU 14 may deactivate the garage-door opening system 20 by communicating with the door opening system 20 and disabling the integral opener 62, thereby preventing the unauthorized driver from using the integral opener 62 to access the garage 50 through the garage door 54 and mechanical apparatus 52. Alternatively, the ECU 14 may communicate directly with the integral opener 20.

The ECU 14 may also remotely communicate with a receiver linked with the mechanical apparatus 52 to disable the mechanical apparatus 52 and prevent its use in opening the garage door 54. Alternatively, the ECU 14 may communicate with and disable the garage door opening system 20 to prevent the mechanical apparatus 52 from opening the garage door 54. Communication between the ECU 14 and the mechanical apparatus 52 can be via satellite link, cell towers, or short-range direct transmission from the vehicle 10 directly to the mechanical apparatus 52 when the vehicle 10 is sufficiently close to the garage 50.

In addition to the integral opener 62, the above also works in conjunction with the hand held opener 60. Such is particularly useful because the hand-held opener 60 may be removed from a vehicle after a thief gains access to the vehicle. With the hand-held opener 60 in the hand or pocket of a thief, the hand held opener 60 may be concealed and then used at a later time on the same day, or at a later date. With the operations described above, the hand-held opener 60 and integral opener 62 may both be rendered useless upon a vehicle break-in when the ECU 14 remotely communicates with the receiver linked with the mechanical apparatus 52 to prevent use of either of the in-vehicle openers 60, 62. Alternatively, the ECU 14 may be configured to directly communicate with and deactivate the hand-held opener 60, instead of the mechanical apparatus 52, to prevent the hand-held opener 60 from transmitting.

The integral opener 62, the mechanical apparatus 52, and the hand-held opener 60 may be disabled mechanically, electrically, by an underlying operating code that operates the devices, or any combination thereof. For example, the openers 60, 62 may be disabled by mechanically preventing access to or disabling the button 58 on each device. For instance, the button 58 may be prevented from being depressed with something that lodges below it. The button 58 may be electrically disabled by electronically or electrically preventing electricity that is controlled by the button to flow upon depressing the button 58. Moreover, the openers 60, 62 themselves may electronically be prevented from transmitting a signal that otherwise would cause the mechanical apparatus 52 to open the garage door 54. That is, an alternate algorithm or subroutine may be invoked to prevent signal or frequency transmission to the mechanical apparatus 52. Finally, during disablement of the integral opener 62, the mechanical apparatus 52, and the hand-held opener 60, any stored addresses and personal information may be purged from memory holding such addresses and information. However, to fully realize the benefits of the present disclosure, any stored information should be retained in memory regardless of the deactivation method utilized to prevent the necessity of subsequent reprogramming of such personal information into memory, if deleted.

In an operation 400, the authorized driver may operate the key fob 26 or insert the key 24 into the lock 30 or the ignition 34 to override and reactivate the navigation system 18 and the garage-door opening system 20, including the garage door openers 60, 62, the mechanical apparatus 52 and the alarm system 16. This feature may be particularly convenient if the predetermined condition of the vehicle 10 detected by the alarm system 16 is a false condition. Alternatively, the authorized user can enter an access code using the user interface 44 of the navigation system 18 to reactivate the navigation system 18 and the garage-door opening system 20, including the garage door openers 60, 62, and the mechanical apparatus 52 if they have been disabled by the ECU 14 or remote service. The alarm system 16 may also be reset and stopped from sounding.

The navigation system 18 and the garage-door opening system 20 may be made to become fully functional when reactivated by the authorized driver or user as described above. Accordingly, it is preferred that the particular means selected for deactivating the navigation system 18 and the garage-door opening system 20, which may include the mechanical apparatus 52, does not purge or delete stored or programmed information in memory, but temporarily restricts access to or use of such stored or programmed information until the navigation system 18 and the garage-door opening system 20 are reactivated by an authorized user, as this does not require the authorized user to re-input or re-program the information into the respective systems.

Therefore, as described above, part of what is disclosed is a method of operating a security system 12 using a vehicle and preventing access to a vehicle system, such as a vehicle navigation system 18, and to a vehicle garage 50 where the vehicle 10 may be stored and any attached structure. The method may entail: monitoring a security condition of the vehicle 10 with a vehicle electronic control unit 14; detecting an unsecure condition of the vehicle 10 with the vehicle electronic control unit 14; sounding a vehicle alarm system 16 upon detecting the unsecure condition of the vehicle; and deactivating a vehicle navigation system 18 after sounding of the vehicle alarm. The method may further entail deactivating a vehicle navigation system 18 by deleting a memory within the vehicle navigation system 18. By deleting or clearing the memory of the navigation system of all information, the navigation system becomes useless. The method may further entail detecting an unsecure condition of the vehicle 10 with the vehicle electronic control unit 14, which includes at least one of: detecting vibration of the vehicle, detecting shaking of the vehicle, and detecting vehicle glass breaking. Vibration of the vehicle may be detected using sensors on the vehicle, such as on the inside surface of the body panels, on the frame, on the unibody structure, etc. The method may further entail silencing the sounding of the vehicle alarm system 16 by turning a key 24 within an exterior vehicle lock 30. Deactivating the vehicle navigation system 18 may further entail deactivating the vehicle navigation system using a command of the vehicle electronic control unit 14; and deleting a memory of the vehicle navigation system 18. The method may further entail deactivating the vehicle navigation system 18 using a remote service. Deactivating the vehicle navigation system 18 may further entail preventing access to, or deleting, street addresses stored in a memory. By preventing access to street address, such information is still retained in a memory, but not accessible. Gaining access would require inserting and turning a key in the exterior lock 30, entering a code into the user interface 44, or inserting and turning the key 24 in the ignition 34. Preventing access to street addresses stored in a memory may further entail at least one of deleting a memory and disabling a user interface of the vehicle navigation system.

Additionally, a method of operating a security system 12 using a vehicle 10 and preventing access to a vehicle system, such as a vehicle navigation system 18, and to a vehicle garage 50, may entail: monitoring a security condition of the vehicle with a vehicle electronic control unit 14. In monitoring the security condition of the vehicle, vibration detecting sensors may be mounted on the inside surface of the body panels, on the vehicle frame, unibody, etc. and wired to the ECU 14 to detect vibration from tampering by a thief, for example. The vibration sensors may sense prying open of a door, prying or picking a lock, or cutting or breaking of glass. Continuing, the method may entail: detecting an unsecure condition of the vehicle with the vehicle electronic control unit 14; sounding a vehicle alarm system from a speaker or horn upon detecting the unsecure condition of the vehicle; communicating a signal from the vehicle electronic control unit 14 to an in-vehicle garage door opener 56, 60, 62; and disabling the in-vehicle garage door opener 56, 60, 62 upon the signal reaching the in-vehicle garage door opener 56, 60, 62 to prevent opening of a vehicle garage door 54. Disabling the in-vehicle garage door opener 56, 60, 62 may further entail disabling a portable, hand-held garage door opener 60. Disabling the in-vehicle garage door opener may further entail disabling a fixed, in-vehicle, non-removable, integral garage door opener 62. The method may further entail deactivating a vehicle navigation system 18 after sounding the vehicle alarm system 16. Detecting an unsecure condition of the vehicle 10 with the vehicle electronic control unit 14 may further include at least one of: detecting vibration of the vehicle, detecting shaking of the vehicle, and detecting vehicle glass breaking.

Furthermore, a method of operating a security system 12 using a vehicle 10 and preventing access to a vehicle system, such as a vehicle navigation system 18, and to a vehicle garage 50 may entail: monitoring a security condition of the vehicle with a vehicle electronic control unit 14; detecting an unsecure condition of the vehicle with the vehicle electronic control unit 14; sounding a vehicle alarm system 16 upon detecting the unsecure condition of the vehicle 10; communicating a first signal from the vehicle electronic control unit 14 to a mechanical apparatus, such as an in-garage, garage door opener 52; and disabling the in-garage, garage door opener 52 upon the signal reaching the in-vehicle garage door opener 56, 60, 62. Communicating the first signal may entail communicating via satellite from the vehicle electronic control unit 14 to an in-garage, garage door opener 52. The method may further entail inserting a key 24 into a vehicle lock 30 thereby deactivating sounding the vehicle alarm 16. The method may further entail: communicating a second signal from the vehicle electronic control unit 14 to an in-vehicle garage door opener 56, 60, 62; and disabling the in-vehicle garage door opener 56, 60, 62 upon the second signal reaching the in-vehicle garage door opener 56, 60, 62 to prevent opening of a vehicle garage door 54. The method may further entail inserting a key 24 into a vehicle lock 30 thereby deactivating or stopping the sounding of the vehicle alarm, enabling the in-vehicle garage door opener 56, 60, 62, and enabling the mechanical apparatus 52, which may be an in-garage, garage door opener 52. The method may further entail reactivating the navigation system 18 by entering a code into a navigation system user interface 44.

Still yet another method of operating a security system 12 using a vehicle 10 and preventing access to a vehicle system, such as a navigation system 18, and to a vehicle garage 50 may entail: monitoring a security condition of the vehicle 10 with a vehicle electronic control unit 14; detecting an unsecure condition of the vehicle with the vehicle electronic control unit 14; sounding a vehicle alarm system 16 upon detecting the unsecure condition of the vehicle 10; disabling an in-vehicle navigation system,18 upon sounding the vehicle alarm; communicating a first signal via satellite from the vehicle electronic control unit 14 to an in-garage, garage door opener 52; disabling the in-garage, garage door opener 52 upon the first signal reaching the in-vehicle garage door opener 56, 60, 62; communicating a second signal from the vehicle electronic control unit 14 to an in-vehicle garage door opener 56, 60, 62; and disabling the in-vehicle garage door opener 56, 60, 62 upon the second signal reaching the in-vehicle garage door opener 56, 60, 62. The method may further entail inserting a key 24 into a vehicle lock 30 thereby deactivating sounding the vehicle alarm 16, enabling the in-vehicle garage door opener 56, 60, 62, and enabling the in-garage, garage door opener 52.

What is claimed is:

1. A method of operating a security system using a vehicle and preventing access to a vehicle system and to a vehicle garage, the method comprising:
    monitoring a security condition of the vehicle with a vehicle electronic control unit;
    detecting an unsecure condition of the vehicle with the vehicle electronic control unit;
    sounding a vehicle alarm system upon detecting the unsecure condition of the vehicle; and
    deactivating a vehicle navigation system after sounding of the vehicle alarm.

2. The method of claim 1, wherein deactivating a vehicle navigation system further comprises deleting a memory of the vehicle navigation system.

3. The method of claim 1, wherein detecting an unsecure condition of the vehicle with the vehicle electronic control unit includes at least one of: detecting vibration of the vehicle, detecting shaking of the vehicle, and detecting vehicle glass breaking.

4. The method of claim 1, further comprising silencing the sounding of the vehicle alarm system by turning a key within an exterior vehicle lock.

5. The method of claim 1, wherein deactivating the vehicle navigation system further comprises:
    deactivating the vehicle navigation system using the vehicle electronic control unit; and
    deleting a memory of the vehicle navigation system.

6. The method of claim 1, further comprising deactivating the vehicle navigation system using a remote service.

7. The method of claim 6, wherein deactivating the vehicle navigation system further comprises preventing access to street addresses stored in a memory.

8. The method of claim 7, wherein preventing access to street addresses stored in a memory further comprises at least one of: deleting a memory and disabling a user interface of the vehicle navigation system.

9. A method of operating a security system using a vehicle and preventing access to a vehicle system and to a vehicle garage, the method comprising:
    monitoring a security condition of the vehicle with a vehicle electronic control unit;
    detecting an unsecure condition of the vehicle with the vehicle electronic control unit;
    sounding a vehicle alarm system upon detecting the unsecure condition of the vehicle;
    communicating a signal from the vehicle electronic control unit to an in-vehicle garage door opener; and
    disabling the in-vehicle garage door opener upon the signal reaching the in-vehicle garage door opener to prevent opening of a vehicle garage door.

10. The method of claim 9, wherein disabling the in-vehicle garage door opener further comprises disabling a portable, hand-held garage door opener.

11. The method of claim 9, wherein disabling the in-vehicle garage door opener further comprises disabling a fixed, in-vehicle, non-removable garage door opener.

12. The method of claim 9, further comprising deactivating a vehicle navigation system after sounding the vehicle alarm system.

13. The method of claim 9, wherein detecting an unsecure condition of the vehicle with the vehicle electronic control unit includes at least one of: detecting vibration of the vehicle, detecting shaking of the vehicle, and detecting vehicle glass breaking.

14. A method of operating a security system using a vehicle and preventing access to a vehicle system and to a vehicle garage, the method comprising:
    monitoring a security condition of the vehicle with a vehicle electronic control unit;
    detecting an unsecure condition of the vehicle with the vehicle electronic control unit;
    sounding a vehicle alarm system upon detecting the unsecure condition of the vehicle;
    communicating a first signal from the vehicle electronic control unit to an in-garage, garage door opener; and
    disabling the in-garage, garage door opener upon the signal reaching the in-vehicle garage door opener.

15. The method of claim 14, wherein communicating the first signal is communicating via satellite from the vehicle electronic control unit to an in-garage, garage door opener.

16. The method of claim 15, further comprising inserting a key into a vehicle lock thereby deactivating sounding the vehicle alarm.

17. The method of claim 15, further comprising:
    communicating a second signal from the vehicle electronic control unit to an in-vehicle garage door opener; and
    disabling the in-vehicle garage door opener upon the second signal reaching the in-vehicle garage door opener to prevent opening of a vehicle garage door.

18. The method of claim 17, further comprising inserting a key into a vehicle lock thereby deactivating sounding the vehicle alarm, enabling the in-vehicle garage door opener, and enabling the in-garage, garage door opener.

19. The method of claim 17, further comprising reactivating the navigation system by entering a code into a navigation system user interface.

20. A method of operating a security system using a vehicle and preventing access to a vehicle system and to a vehicle garage, the method comprising:
    monitoring a security condition of the vehicle with a vehicle electronic control unit;
    detecting an unsecure condition of the vehicle with the vehicle electronic control unit;
    sounding a vehicle alarm system upon detecting the unsecure condition of the vehicle;
    disabling an in-vehicle navigation system upon sounding the vehicle alarm;
    communicating a first signal via satellite from the vehicle electronic control unit to an in-garage, garage door opener;
    disabling the in-garage, garage door opener upon the first signal reaching the in-vehicle garage door opener;
    communicating a second signal from the vehicle electronic control unit to an in-vehicle garage door opener; and
    disabling the in-vehicle garage door opener upon the second signal reaching the in-vehicle garage door opener.

21. The method of claim 20, further comprising inserting a key into a vehicle lock thereby deactivating sounding the vehicle alarm, enabling the in-vehicle garage door opener, and enabling the in-garage, garage door opener.

* * * * *